Feb. 12, 1952  B. J. BASKERVILLE  2,585,425
HAY BALER
Filed April 14, 1944  9 Sheets-Sheet 1

Fig.1.

INVENTOR.
Benjamin J. Baskerville
BY
Charles K. Woodin
Agent.

Feb. 12, 1952     B. J. BASKERVILLE     2,585,425
HAY BALER

Filed April 14, 1944     9 Sheets-Sheet 2

INVENTOR.
Benjamin J. Baskerville
BY
Charles K Woodin
Agent

Feb. 12, 1952      B. J. BASKERVILLE      2,585,425
HAY BALER

Filed April 14, 1944      9 Sheets-Sheet 3

INVENTOR.
Benjamin J. Baskerville
BY
Charles K. Woodin
Agent.

Feb. 12, 1952     B. J. BASKERVILLE     2,585,425
HAY BALER Filed April 14, 1944     9 Sheets-Sheet 4

INVENTOR.
Benjamin J. Baskerville
BY
Charles K Woodin
Agent

Feb. 12, 1952    B. J. BASKERVILLE    2,585,425
HAY BALER

Filed April 14, 1944    9 Sheets-Sheet 6

INVENTOR.
Benjamin J. Baskerville
BY
Charles K Woodin
Agent.

Patented Feb. 12, 1952

2,585,425

UNITED STATES PATENT OFFICE 2,585,425

HAY BALER

Benjamin J. Baskerville, Joliet, Ill.; Margaret K. Baskerville, Raymond A. Baskerville, Marie A. Baskerville, Frances A. Lennon, and Walter J. Baskerville, heirs of said Benjamin J. Baskerville, deceased, assignors to Frances A. Lennon, Maywood, Ill., individually and as trustee for Marie A. Baskerville, Joliet, Walter J. Baskerville, Manhattan, and Raymond A. Baskerville, Symerton, Ill.

Application April 14, 1944, Serial No. 531,071

15 Claims. (Cl. 100—20)

The present invention relates to baling equipment and is more particularly directed to a hay baling press having means for providing dual wire loops for encircling a bale together with appropriately timed and operated tying and cutting means for completing a finished bale.

There are numerous hay balers and similar baling machines on the market that incorporate so many intricate mechanisms that the first cost of such machines is exorbitant and likewise the maintenance and upkeep of such machines are also impractical and costly. It has therefore been one of the main objects of the present invention to provide a baling press that is comparatively inexpensive, automatic in operation, and wherein the mechanisms for producing the necessary baling and tying functions are comparatively simple in construction and incorporate rugged parts capable of withstanding much abuse in order to reduce maintenance and upkeep costs as well as replacement of parts.

Another object of the present invention is to utilize the motion of the baling plunger or more specifically as in this case, the cross-head for the plunger, for activating in synchronism the various mechanisms which coact to loop the wires about the finished bale, tie the same and finally cut the wires. The same mechanism which ties the wires also knots the dual wires disposed on either side of the baling press to provide succeeding loops to again form wire back stops for the additional hay which is then supplied to the press and compressed by the plunger.

Another feature of the present invention is to provide suitable gauging means which operatively establish a connection between the plunger or its cross-head and the tying and cutting mechanisms whenever a bale of hay of predetermined size has been formed.

In general the hay press of the present construction, includes the general design of any conventional form of hay press or may be of any type of baling machine to which may be readily added the practical and simplified mechanisms that coact in synchronism at predetermined intervals with the motion of the plunger and cross-head for looping the wires about the finished bale, tying the same, and cutting the wires; such action also preparing the subsequent loops to back up the hay for the next succeeding bale.

Various other objects and advantages supplementing those specifically set out above are also inherently embodied in the device of the present invention and shall be subsequently pointed out in the following detailed description having reference to the drawings which disclose a preferred embodiment of the invention.

The general construction of the hay baler is best illustrated in Figs. 1, 2, 3 and 5. A chassis 21 is supported upon wheels such as 22, the front steering wheels not appearing in the illustration, with a baling frame generally indicated at 23 supported upon the chassis 21. The baling frame 23 consists primarily of longitudinal angle irons 24, 25, 26 and 27 suitably positioned and connected by means of side plates 28 and 30, and the bottom plate 31, all clearly illustrated in Fig. 3. Any suitable form of feed hopper 32 may be carried by the framework of the baler in proper relation to the stroke of the plunger. Extending rearwardly from the hopper 32 is a roller for tucking hay as indicated at 33 and a top plate 34 for cooperating with the plates 28, 30 and 31 to provide the necessary compression chamber for receiving hay from ahead of the plunger. The baling framework 23 is suitably connected and supported by means of brackets such as 35 at the forward ends and by means of suitable pads or the like such as 36 intermediate the length of the baler.

Figure 1:
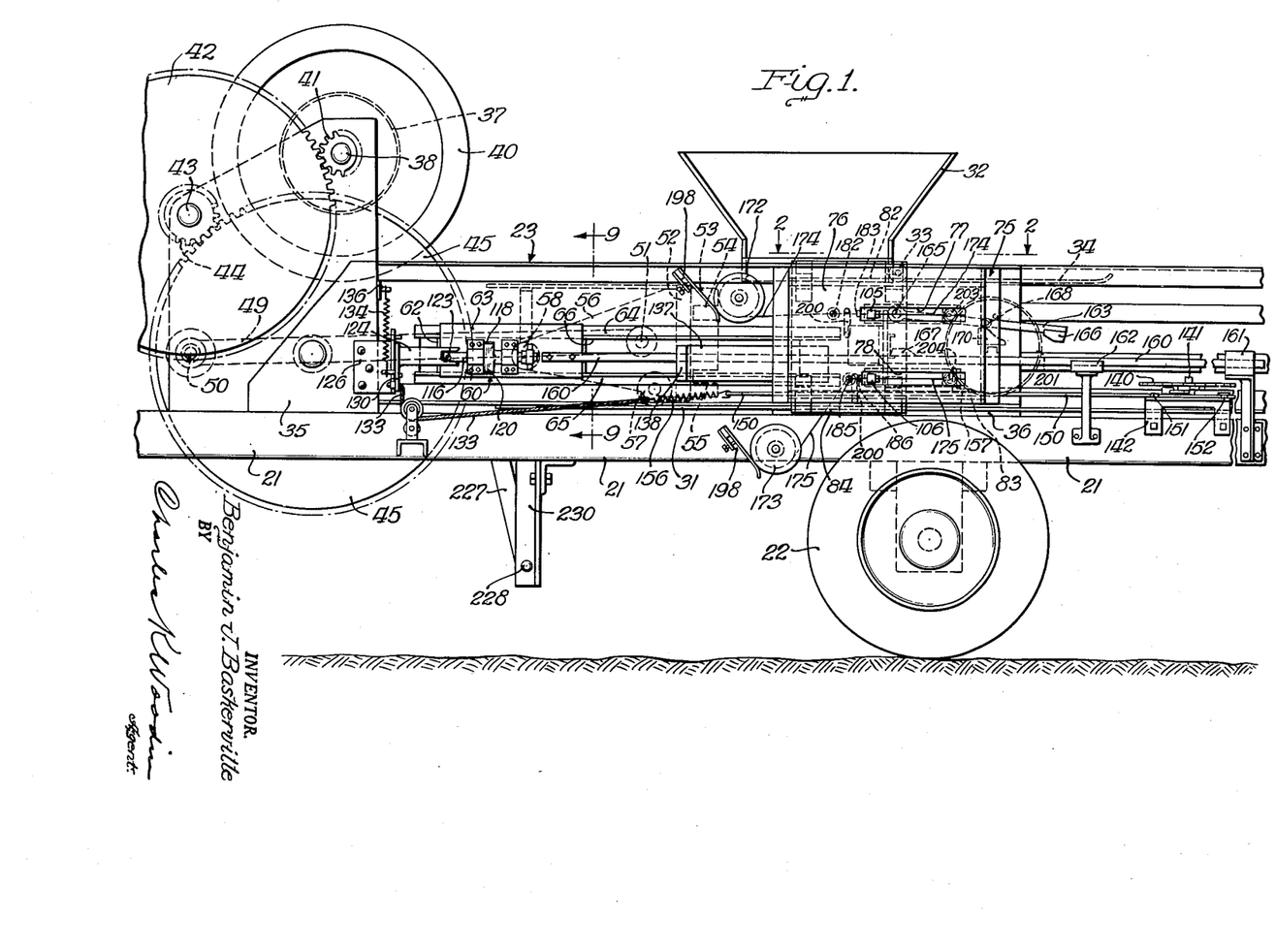
Fig. 1 is a side elevational view of a greater portion of a mobile hay baler embodying the mechanisms for carrying out the principles of the present invention.

The plunger and driving mechanism therefor may also be of any conventional type or design. As shown in Fig. 1, a pulley 37 adapted to be belt driven, drives a shaft 38 carrying a flywheel 40. The drive is transmitted from shaft 38 through gear 41 to the large gear 42 mounted on shaft 43 for driving a wide gear 44 which spans and connects with a pair of dual spaced gears 45 and 46 respectively, best illustrated in Figs. 1 and 9.

Figure 9:
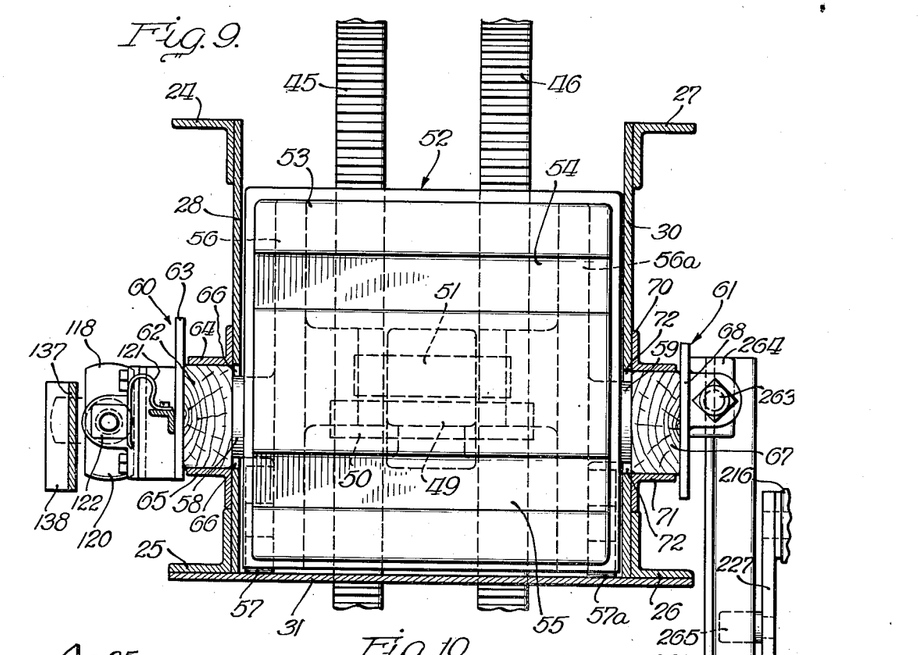
Fig. 9 is another transverse sectional view of the hay baler taken substantially as viewed along the lines 9—9 in Figs. 1 and 5 respectively.

A pitman 49 connects with a cross pin 50 extending between and carried by the two gears 45 and 46 while the rearward end of the pitman 49 is pivotally connected with the pin 51 carried by the plunger 52, see Figs. 1 and 9. Plunger 52 is provided with a suitable head 53 cross slotted as at 54 and 55 for purposes hereinafter to be described. The plunger 52 is provided with side wings such as 56 and 56a that carry suitable wheels 57 and 57a for riding on the bottom plate 31 of the baler frame; such wings also connecting as at 58 and 59 with the cross-heads 60 and 61 best illustrated at Figs. 1 and 9.

The cross-head 60 consists of a block of wood 62 secured to a plate 63 and both of the latter are guided between angles 64 and 65 secured to the side 28 of the baling frame and adjacent the edges of an opening 66 in said side which provides clearance for the connecting member 58 of the wing 56 of the plunger 52.

The cross-head 61 is similarly constructed and consists of a block of wood 67 connected with the cross-head boss 59 and having a plate 68 secured to the outer face thereof. The block of wood 67 is guided between the angles 70 and 71 flanking the edges of the opening 72 in the baling frame plate 30, such openings 72 providing the necessary clearance for the boss 59 of the plunger wing 56a.

It is now apparent from the foregoing description that by applying power to the pulley 37, the gear train described shall become rotationally operative and through such gear reduction shall drive the gears 45 and 46 rather slowly to impart motion to the pitman 49. This action reciprocates the plunger 52 within the baling frame 23 to force hay that is being fed through the hopper 32, into the compression chamber bounded by the plates 28, 30, 31 and 34 to accomplish the baling function. Plunger 52 is readily guided within the baling frame 23 by means of the wheels 57 and 57a and through the instrumentality of the wing bosses 58 and 59 that are secured to the cross-heads 60 and 61 respectively, such cross-heads being guided by the baling frame angles 64, 65, 70, and 71.

The needle mechanism shall now be described more specifically in connection with Figs. 2 and 3. The needle frame shown generaly at 75 may be of any convenient suitable construction, preferably as of angle iron as illustrated, and is secured to the longitudinal angles 24 and 25 of the baling frame 23. The outer portion of the needle frame may be closed by a suitable plate 76 slotted as at 77 and 78 to provide needle clearance. Suitable cross-members such as 80 and 81 are vertically disposed within the needle frame for the purpose of supporting two spaced guide rods 82 and 83 which are fixed and provided for the purpose of forming ways for the needle carriage generally indicated at 84. The needle carriage 84 consists of a fore and aft extending plate 85 and a second plate 86 extending at right angles to the first plate and in a direction transversely of the hay baler, said plates both being securely fastened together by means of a bracket 87. A pair of spaced bearings 88 and 88a are secured to the upper portion of plate 85 and hold a sleeve such as 90 longitudinally therebetween for riding upon the upper guideway rod 82 of the needle frame 75.

Figure 3:
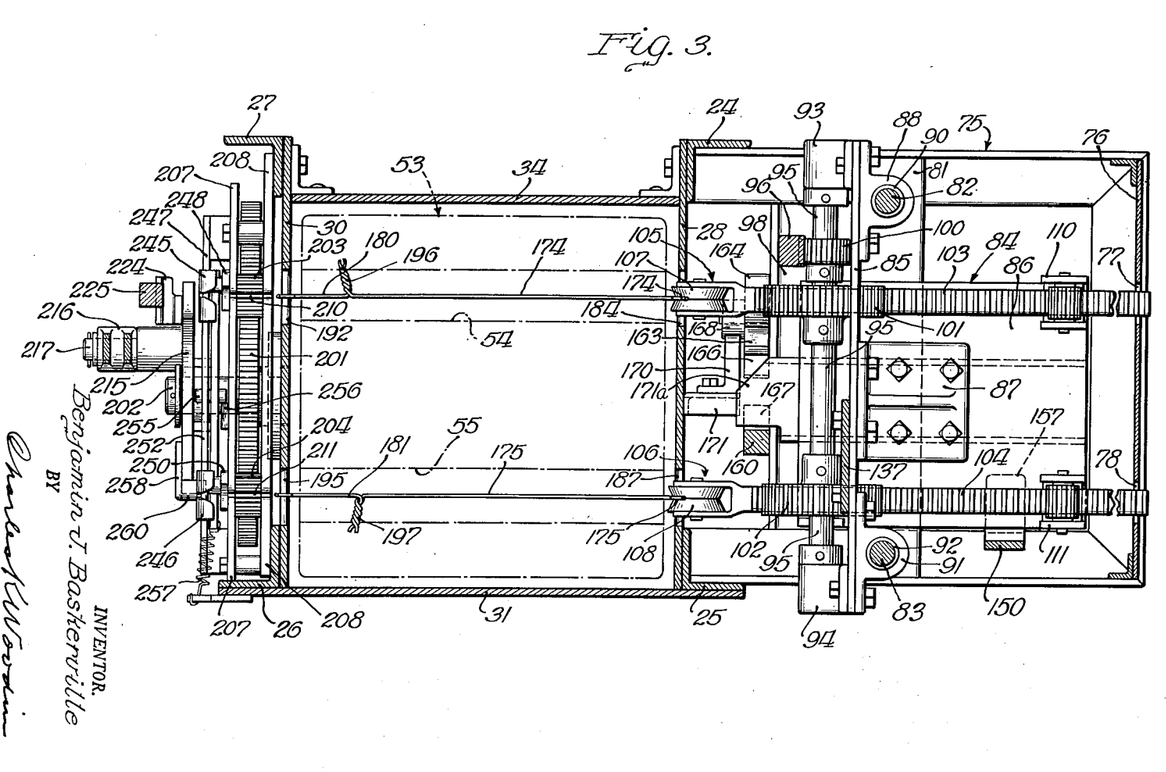
Fig. 3 is an enlarged transverse cross-sectional view through the hay baler taken substantially along the lines 3—3 of Fig. 2, the hopper having been omitted in this view.

Another pair of spaced bearings such as indicated at 91 in Fig. 3 are secured to the lower portion of plate 85 and support a sleeve 92 therebetween which sleeve rides upon the lower guideway rod 83 of the needle frame 75. Thus a carriage 84 is provided which can move longitudially of the baler upon the guide rods 82 and 83 within the confines of the needle frame 75.

Plate 85 of the carriage 84 is also provided with bearings 93 and 94 for journalling a vertically disposed needle drive shaft 95, the latter shaft being mounted on plate 85 on the side opposite from the carriage guideway mechanism. Continuing reference to Figs. 2 and 3, a rack 96 is fixedly secured upon suitable vertical angles 97 and 98 forming a portion of the needle frame 75 and this rack extends longitudinally of the hay baling frame in parallel relation to the guideways 82 and 83 and consequently parallel to the movement of the carriage 84. A pinion 100 is secured to the shaft 95 and meshes with the rack 96 for the purpose of imparting rotational movement to the shaft 95 whenever the carriage 84 is moved relatively to the rack 96. Another set of gears such as 101 and 102 are also secured to the shaft 95 in spaced relation and are adapted for meshing with the racks 103 and 104 comprising the stems or body portions of the needles indicated generally at 105 and 106 in Fig. 3. Each of the needles 105 and 106 pivotally carries rollers 107 and 108 for contact with the baling wires. Each roller is concave or conically constructed to have a low central valley circumferentially formed to guard against the wires slipping off of the rollers while the needles are operating to carry the dual wires to the opposite side of the baler for tying.

Figure 2:
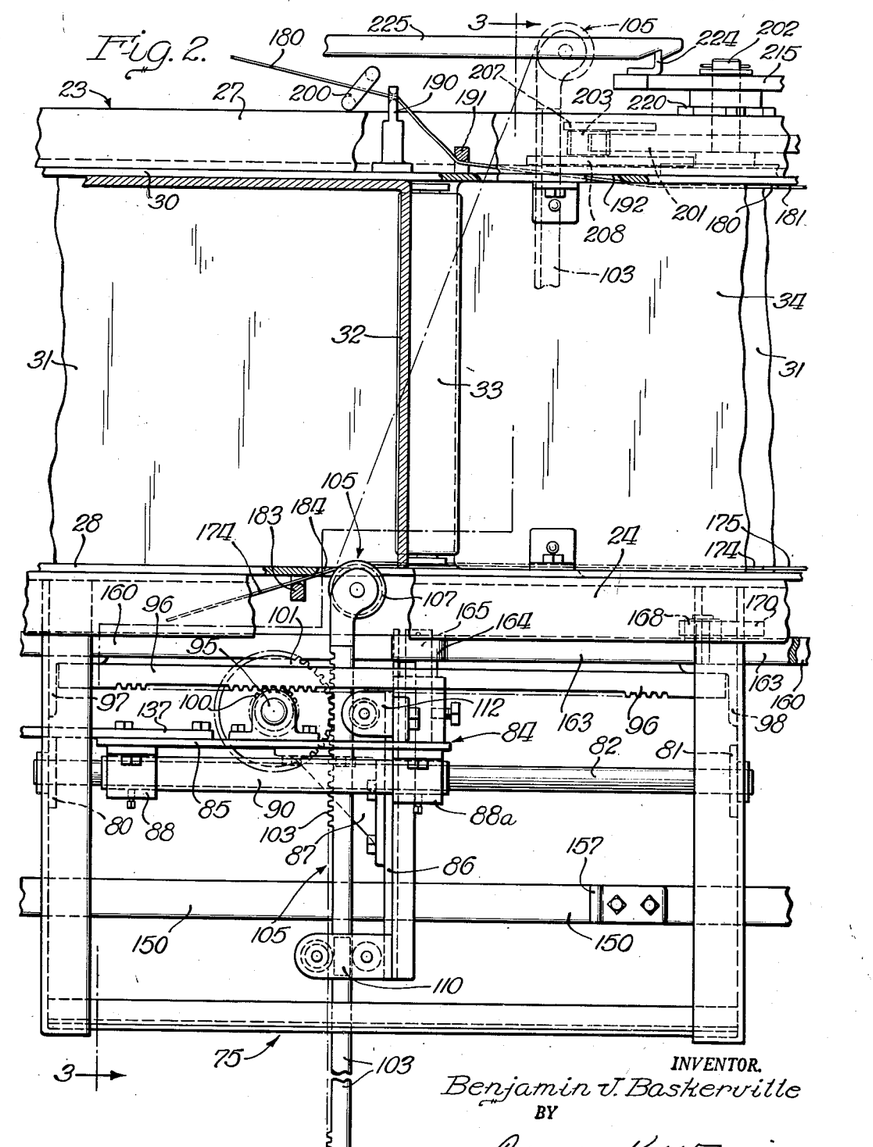
Fig. 2 is an enlarged fragmentary plan view of the baler substantially as seen along the line 2—2 in Fig. 1 showing the needle mechanisms, certain portions being broken away and in section to illustrate details of construction.

The needles are maintained in aligned relation upon the carriage 84 and in operative engagement with the gears 101 and 102 by means of the outboard guiding structures 110 and 111 respectively, and by means of the guiding units 112, see Fig. 2. All such units are mounted in plate 86 and adapted to keep the needles in cooperative engagement with the driving gears 101 and 102 to maintain the needles in position. The foregoing guiding units as described in connection with needles 105 and 106 may be of any suitable construction and may include such parts which will efficiently position each of the needles for rectilinear movement in a true straight line motion and in operative engagement with the driving gears.

From the description of the needle mechanism it will be obvious that the needles 105 and 106 will be retracted and out of the compression chamber of the baling press when the carriage 84 is in the left hand position within the needle 75 as indicated in Fig. 2. Upon motion of the carriage to the right of Fig. 2, rack 96 will impart rotary motion to shaft 95 through the instrumentality of the gear 100 and thereupon gears 101 and 102 will rotate in a direction to cause the needles 105 and 106 to advance into the compression chamber and therethrough to carry the wires to the tying mechanism substantially into a position as indicated in dotted lines in the upper portion of Fig. 2. This is the end of the stroke of the carriage under the designed conditions of operation of the present baler and therefore the needles will be stopped in the dotted line position substantially as shown.

Figure 10:
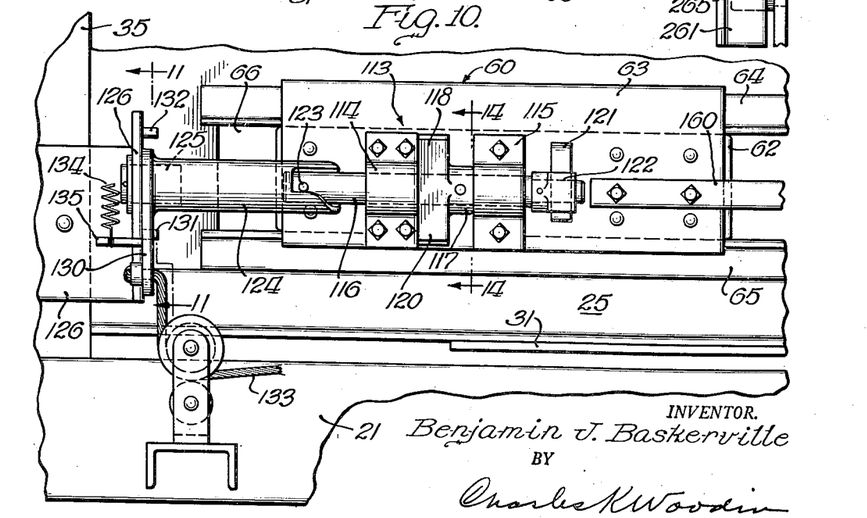
Fig. 10 is an enlarged side elevational view of the plunger cross-head portion of the baler and the associated mechanisms cooperating therewith for rendering the cross-head effective to operate the needles, tying mechanism, and cutting means.
Figures 12, 14:
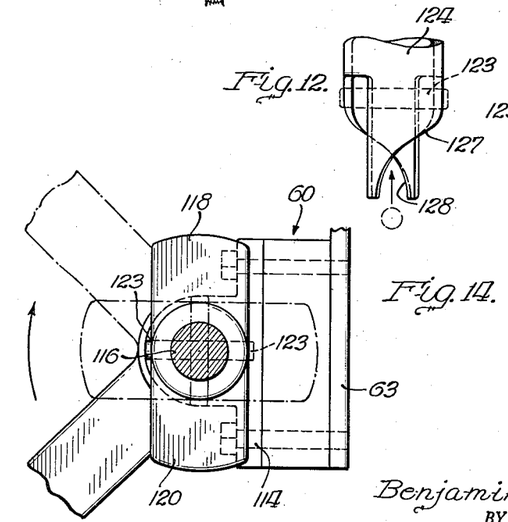
Figs. 12 and 13 are elevational views taken substantially at 90° with respect to each other of the cam means provided to cooperate with the cross-head mechanism.
Fig. 14 is another detailed sectional view taken substantially along the line 14—14 in Fig. 10.
Figure 13:
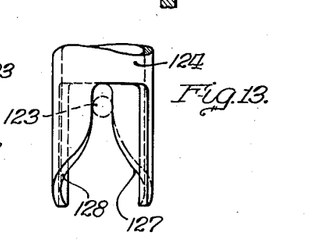

The means or mechanism for imparting motion to the needle carriage 84 is mounted on the crosshead plate 60 in Fig. 10 and is generally indicated by the reference numeral 113. Mechanism 113 includes a pair of bearings 114 and 115 secured to plate 63 for rotatably supporting a shaft 116. Secured intermediate the bearings 114 and 115 is a sleeve 117 having lugs 118 and 120. Lugs 118 and 120 are symmetrical and identical but displaced at 180 degrees with respect to each other as indicated in Fig. 14. The lugs 118 and 120 are either maintained in the full line vertically disposed position as shown in Fig. 14 or in the dotted line horizontal position by means of the spring 121 engaging any one of the four flat sides of the square detent 122 secured to the shaft 116 as best shown in Figs. 9 and 10. A pin 123 is secured to the opposite end of the shaft 116 from the detent means and is adapted for cooperating with a tubular cam 124 rockably carried by means of the pin 125 on a bracket 126 which is secured to the gear supporting bracket 35 of the baler chassis.

The details of construction of the cam 124 is best illustrated in Figs. 1, 11, 12 and 13. It should be noted that the cam 124 is of tubular construction and rockable about an axis coincident with the axis of shaft 116 so as to cause simultaneous engagement of the symmetrical and double cam surfaces 127 and 128 with the oppositely protruding portions of the pin 123 of shaft 116. Therefore, as the plunger and its associated cross-heads return to the extreme retracted position wherein the pitman 49 is in the position indicated in Fig. 1, pin 123 and the mechanism associated therewith shall be turned into the relation disclosed in Fig. 10 wherein pin 123 is horizontally disposed and the sleeve 117 will have the lugs 118 and 120 vertically disposed and in parallel relation with the surface of plate 63. This relationship shall be maintained so long as the tubular cam 124 is maintained in the position indicated. However, at a predetermined moment when the tubular cam 124 is permitted to shift 90 degrees angularly with respect to shaft 116, the guiding or camming surfaces 127 and 128 of the cam 124 will also be shifted 90 degrees, whereupon the return of the plunger and its cross-head on the next succeeding return stroke will cause the pin 123 to strike the camming surfaces 127 and 128 now angularly displaced whereby the pins 123 (see Figs. 11 and 14) will be turned 90 degrees rotating shaft 116 and the lugs 118 and 120 into a 90 degree position from that shown in Fig. 10 so that the lugs will thereby be horizontally positioned.

Figure 11:
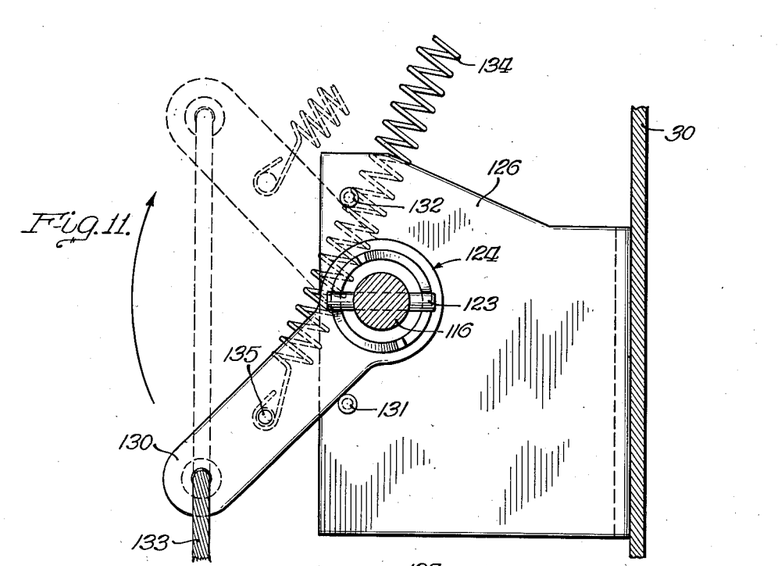
Fig. 11 is a detailed view taken substantially along the line 11—11 in Fig. 10.

The displacement of the tubular cam 124 angularly is best disclosed in Fig. 11 wherein the cam 124 is provided with the arm 130 which operates between the limit pins 131 and 132 carried by the bracket 126. The arm 130 is normally maintained against the lower pin by means of the tension on cable 133 secured to the end of arm 130. Release of tension upon the cable 133 will permit the spring 134 to come into play to move arm 130 into the dotted line position indicated in Fig. 11 by reason of the connection of spring 134 with pin 135 on the arm 130. The other end of spring 134 is conveniently secured to any portion of the framework of the baler somewhat as indicated at 136 in Fig. 1.

The disposition of the lugs 118 and 120 in a horizontal position produces a striking unit which is now positioned directly in the path of a plate 137 shown in Figs. 1, 2 and 9, such plate being securely fastened to the carriage 84 for movement directly with the latter. A reinforcing block 138 is also secured to the protruding end of the plate 137 for absorbing the shock upon contact of either one of the lugs 118 and 120 with this carriage actuating plate member.

The rotation of shaft 116 is continuous in one direction, clockwise as viewed in Figs. 9, 11 and 14, and which direction of turning motion transmitted to pin 123 is well illustrated in the position of the cam member 124 in Fig. 12. Since this rotatable action of shaft 116 is continuous, it is obvious that either one of the lugs 120 or 118 will operate as a striking member depending upon the angular position of sleeve 117 relative to the fixed and reciprocating striking plate 137. In this manner, the cam 124 produces a well balanced cam action which carries the torque to both ends of pin 123 causing the square detent 122 to rotate through a 90 degree angle to be again stopped when spring 121 contacts the next succeeding flat space of such detent.

Figure 15:
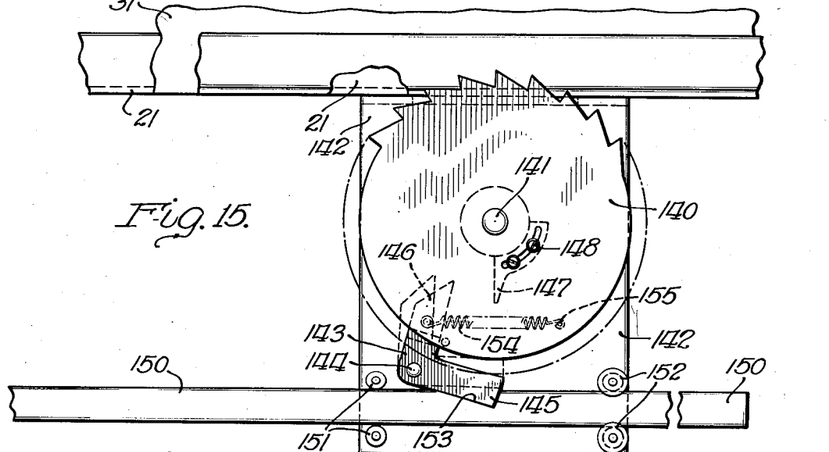
Fig. 15 is an enlarged fragmentary plan view of the gauging mechanism adapted for timing the operation of the tying and cutting mechanisms after a predetermined length of bale has been formed.

The angular control of the tubular cam 124 by means of cable 133 shall best be understood by reference to Figs. 1, 10, 15 and 16. A toothed gauge wheel 140 is pivotally carried upon a shaft 141 suitably journalled upon a plate bracket 142 which is fastened to the chassis 21. The toothed gauge wheel 140 may be of any suitable construction and may be replaced with wheels of larger diameter or the same may be constructed as an adjustable expandible wheel of a known type for producing shorter or longer bales of hay. However, for the purpose of illustration, a solid wheel such as indicated at 140 in Fig. 15 has been incorporated to function as the initial instrumentality for gauging the length of a bale of hay, and to set the needles and the tying and cutting mechanisms into operation at predetermined intervals. A bell crank such as shown at 143 in Fig. 15 is pivotally carried upon the pin 144 secured to the bracket plate 142. One end 145 of the bell crank provides a latching dog while the other end 146 of the bell crank provides a trip member having cooperative engagement with the trip finger 147 adjustably carried by bolt and slot means 148 upon the toothed gauge wheel 140.

A slide bar 150 is guided between rollers 151 and the flanged rollers 152, all of said rollers being pivotally supported upon the bracket 142, such slide bar being slidably supported upon said bracket. This slide bar 150 is notched as at 153 for the reception of the detent or latched dog end of the bell crank 143, the latter preventing movement to the left of the slide bar 150 as shown at in Figs. 15 and 16. The dog 143 is normally maintained or urged to rotate in a clock-wise direction by means of the spring 154 connected thereto and to a pin 155 also carried by the bracket 142. This prevents the disengagement of the bell crank with the slide bar until such a time when the trip finger 147 strikes the arm 146 of the bell crank 143 thereby moving the latch dog 145 out of the notch 153 in the slide bar 150.

The other end of the slide bar 150 as shown in Figs. 1, 2 and 3 is slidably supported upon the framework 75 of the needle frame and is held against dislodgement by any suitable means while a spring such as 156 shown in Fig. 1 connects the left hand end of the slide bar with a loop at the end of cable 133. This spring will normally maintain the cable 133 under tension to hold the arm 130 and its corresponding tubular cam 124 in the inoperative position indicated in full lines in Fig. 11. The spring 156 will also maintain the shouldered portion of the slide bar notch 153 against the end of the latch dog 145 and this position of the parts will be maintained so long as the bell crank 143 is in the position indicated in Fig. 15.

Figure 16:
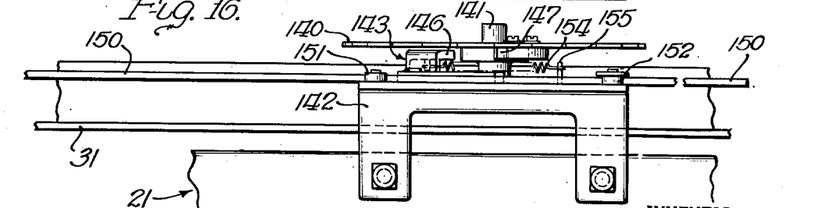
Fig. 16 is a side elevational view of the structure shown in Fig. 15.

Whenever the gauge wheel 140 makes a complete revolution by reason of the wheel 140 being located with its teeth protruding into the baling chamber and in contact with the side of a forming bale, bell crank 143 will be tripped by means of the finger 147 releasing the notched slide rod 150 to permit the latter to move to the left as viewed in Figs. 15 and 16 through which action the tension of spring 156 is nullified to permit the cable 133 to withdraw under the action of spring 134 acting upon the arm 130. This obviously rotates the tubular cam 124 through 90 degrees by means of the action previously explained, causing pin 123 to rotate either one of the lugs 118 or 120 into the path of the plate 137 carried by the needle carriage. Thereafter, on the compression stroke of the plunger, the cross-head 60 moves toward the needle carriage and plate 137 is struck by the protruding lug and actuates the needle carriage the predetermined amount as permitted by the remainder of the plunger stroke, and by reason of the dimension of the parts involved the needles are caused to move from the full line position indicated in Fig. 2 into the dotted line position therein shown.

The action of the carriage moving to the right as viewed in Figs. 1 and 2 causes the plate 86 of the carriage 84 to strike a lug 157 secured to the slide bar 150 which has been previously moved towards the carriage when released by the bell crank 143, and thereby slide bar 150 is again moved to the right sufficiently to cause the latch dog 145 to again enter and engage slot 153 in the slide bar 150, recocking this mechanism until another complete revolution of the gauge wheel has been accomplished.

Figure 4:
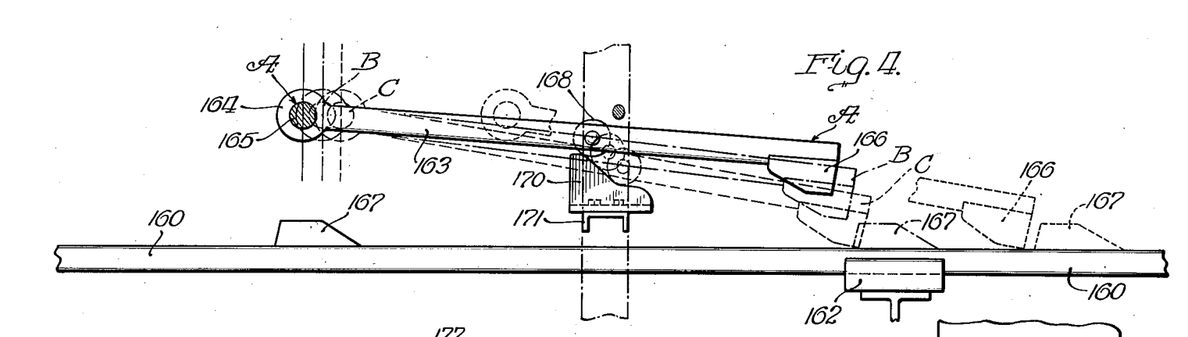
Fig. 4 is an enlarged fragmentary detail view of the means provided for restoring the needle mechanism to normal inoperative position after the needle mechanism has carried out its prescribed functions.

The needle carriage 84 has now been advanced to the right and the needles have been projected through the baling chamber to bring the wires under the control of the tying and cutting mechanisms. It is now necessary to return the carriage immediately to its original position as shown in full lines in Fig. 2 for retracting the needles before the next successive forward or compression stroke of the plunger. This is best accomplished by the mechanism illustrated in Figs. 1 and 4. A draw bar such as 160 is connected by bolts or other suitable means to the plate 63 of the cross-head 60 and passes through the needle frame 75 to be slidably supported upon an outboard bearing 161 in Fig. 1 secured to the chassis 21. The intermediate portion of said bar is supported upon an open faced slide or bearing member 162 also carried by the chassis 21. A trip bar 163 is pivotally supported at 164 upon a pin 165 which is secured to the plate 85 of the carriage 84. The opposite end of the trip bar 163 carries a hardened lug 166 having cooperative engagement with the lug 167 securely fastened to the draw bar 160. A roler 168 is pivotally carried intermediate the length of the trip bar 163 having cooperative engagement with the cam 170 supported upon a suitable channel 171 carried by the side 28 of the baling chamber Whenever the needle carriage is in the left-hand or inoperative position illustrated in Fig. 2, the trip bar 163 is in the full line position indicated in Fig. 4 wherein the striking lug 166 is entirely out of the path of the lug 167 of the draw bar 160. This position obviously is maintained by the roller 168 which is now at the high point of the cam 170. As the needle carriage is moved to the right through the action of the mechanism hereinbefore explained, the trip bar 163 gradually moves into any one of a number of successive positions, two of which have been indicated in Fig. 4 as a dash and dotted line position B and a dotted line position C, the original full line position being indicated by A. The lug 167 is also indicated in the same relative dotted line positions. When the needle carriage has been moved to the extreme right hand position the bar 163 will have its lug 166 resting upon the draw bar 160 immediately ahead or to the left of the lug 167 as viewed in Fig. 4. When the parts are in this position, the plunger will be in its forward or at the end of the compression stroke and in a position to have the movement thereof reversed. Consequently the movement of the cross-heads 60 and 61 shall also therefore be reversed under the action of pitman 49; the draw bar 160 will therefore be reversed in its direction of motion by reason of its connection with the cross-head 60. When this occurs the lug 167 will strike the lug 166 on the trip bar 163 to move the carriage 84 and its associated mechanisms substantially back into the position shown in full lines in Fig. 2. Before the carriage has completely arrived at its inoperative position shown in Fig. 2, however, the end of the trip 163 and the connected lug 166 will be forced away from in front of the lug 167 by means of the roller 168 again engaging the cam 170. Thereafter, lug 167 passes beneath the trip bar and its associated parts and moves to the left with the draw bar 160 until the same lug 167 strikes a protuberance or projection such as 171a in Fig. 3. The latter may be of any suitable construction sufficient to move the carriage 84 to the left into its extreme inoperative position illustrated in Fig. 2 upon being struck by the lug 167. This therefore completes the cycle of operation of the movement of the needle carriage and obviously of the advancement and retraction of the needles to bring the wires into active engagement with the tying and cutting mechanism on the opposite sides of the baling press.

Figure 5:
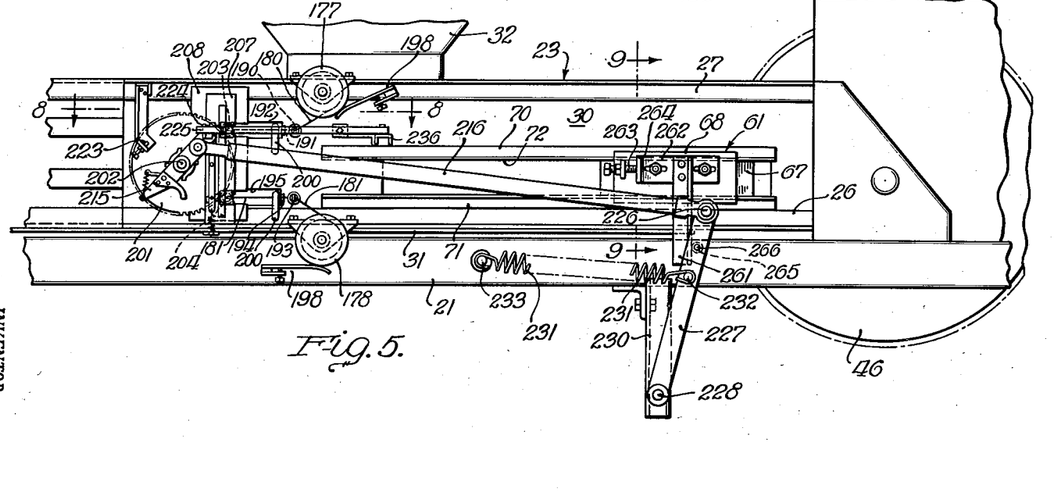
Fig. 5 is a side elevational view similar to Fig. 1 illustrating intermediate portions of the baler as viewed from the reverse side to that illustrated in Fig. 1.

Various forms or arrangements of wire feeding and wire guiding mechanisms may be incorporated to supply the baling wire to the press. For purposes of illustration the present machine includes a pair of suitably supported wire reels 172 and 173 shown in Fig. 1 to supply the upper and lower wires 174 and 175 respectively, while another pair of wire reels 177 and 178 are suitably mounted on the opposite side of the baling press as illustrated in Fig. 5 to supply the upper and lower wires 180 and 181 respectively. The wire 174 is suitably guided by means of the guide post 182 to the eye 183 and from there the wire enters the baling chamber through the opening 184 in plate 28 as best shown in Fig. 2. Referring again to Fig. 1 the wire 175 passes through the apertured guide post 185 and thence to the eye 186 from which it enters the baling chamber through the opening 187 in plate 28 as best illustrated in Fig. 3 and in the same fashion as the wire 174 is illustrated in Fig. 2. This arrangement provides a pair of wires for one side of the baling press and a similar arrangement is illustrated in Fig. 5 for the opposite side of the baling press. Wire 180 enters the apertured wire guide 190 and passes through the eye 191 and thence through the opening 192 in plate 30 for passing into the baling chamber. This latter construction is also well illustrated in Fig. 2. The lower wire 181 passes through the apertured guide post 193 and thence to the eye 194 and enters the baling chamber through the opening 195 illustrated in Fig. 5. Referring to Fig. 3 it will be seen that the wires 174 and 180 are knotted or tied as at 196 while the wires 175 and 181 are knotted or tied as at 197. This arrangement provides a pair of wire loops extending in vertical spaced relation across the baling chamber for backing up the hay that is being pressed into this chamber by the plunger, such wire loops being automatically advanced rearwardly step by step under the action of the plunger.

Each of the wire reels 172, 173, 177 and 178 are provided with suitable adjustable spring tensioning means such as indicated generally at 198, and weighted rings or other suitable tensioning or weight members having operative connection with the wire are indicated as at 200. These weights act to immediately straighten out or tension the wire loops such as shown in Fig. 3 immediately upon the completion of the prior bale of hay so that the wires are maintained in parallel spaced relation between the wire guiding eyes 183 and 191 respectively, and 186 and 194 respectively. This positions the wires in the same operating planes in which the needles 105 and 106 move and also places the wires in a position where the needles will pick up the same and place them into the proper position at the opposite side of the baler so as to introduce the wires into the tying and cutting mechanisms after the completion of the bale of hay.

Figures 6, 7:
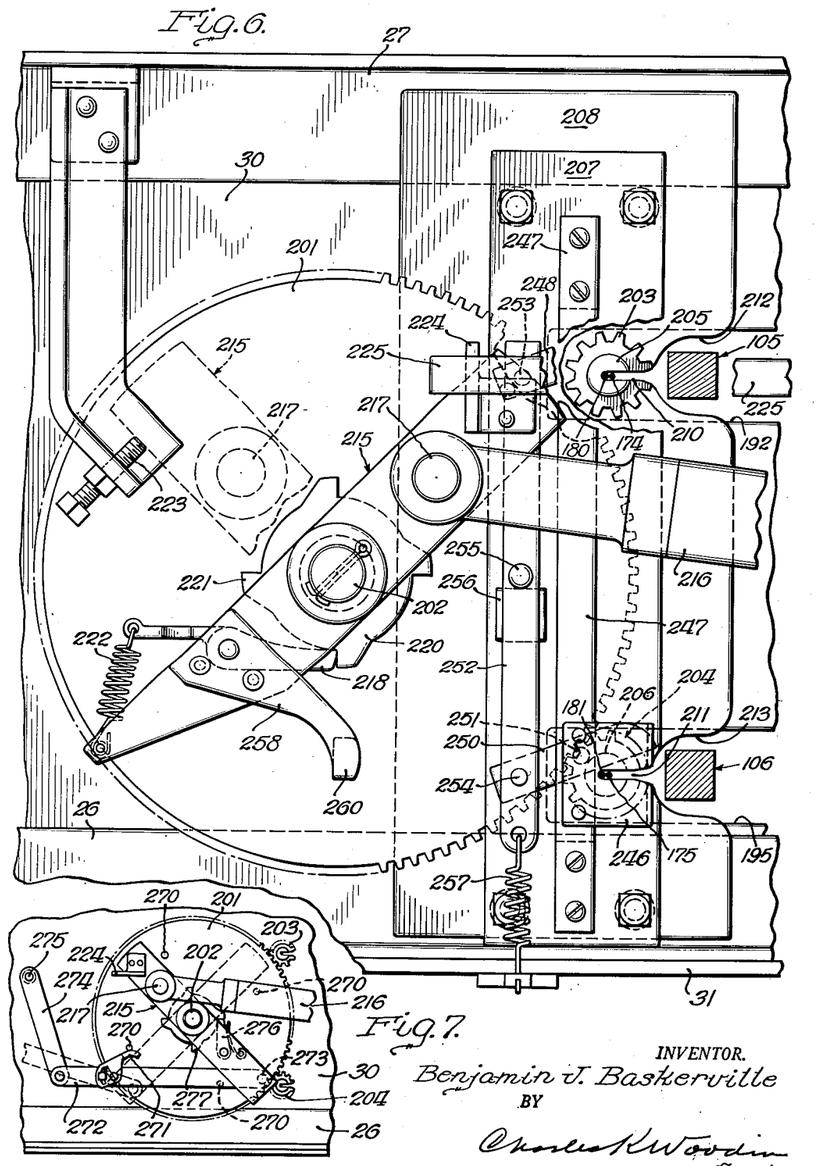
Fig. 6 is an enlarged detailed view with certain parts broken away and in section to illustrate details of construction of the mechanism provided for tying and cutting the dual wires upon completion of a bale of hay.
Fig. 7 is a similar view to that illustrated in Fig. 6 showing certain additional details of mechanism which may be added to provide positive control means for orienting the tying mechanism.
Figure 8:
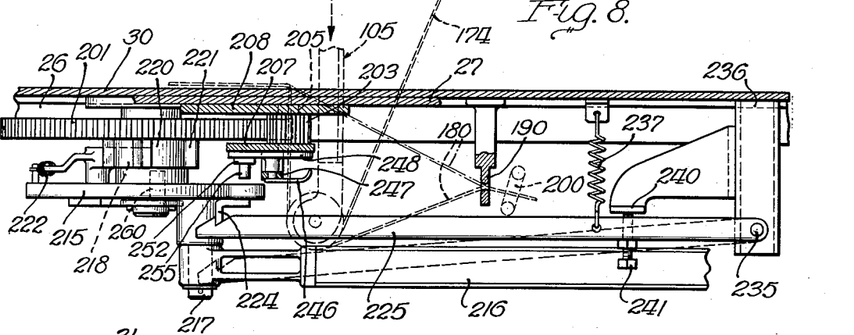
Fig. 8 is a plan sectional view taken substantially along the line 8—8 in Fig. 5.

The wire tying and cutting mechanism is best understood by reference to Figs. 5, 6 and 8. A large gear such as 201 is pivotally supported upon the side of the baling frame upon a stud or pin 202 to mesh with a pair of wire twisting gears 203 and 204. Gears 203 and 204 are provided with the hubs 205 and 206 respectively to be journalled in the spaced plates 207 and 208 conveniently bolted to the side of the baling frame. As will be noted in Fig. 6 the wire receiving slots 210 and 211 in the gears 203 and 204 respectively are horizontally positioned and disposed in line with suitable guiding slots 212 and 213 formed in the plates 207 and 208 respectively. For purposes of explanation the needles 105 and 106 have been shown in advanced or projected positions in cross section in Fig. 6 in which case the wires are disposed in the axial relations shown within the gears 203 and 204 for twisting and cutting.

It is obvious that various ratios may be maintained between the gear 201 and the small gears 203 and 204, but in the present case the large gear 201 is provided with 96 teeth while each of the gears 203 and 204 are provided with 12 teeth. Furthermore the means for actuating gear 201 is such that the same will be angularly oscillated 90 degrees in a counter-clockwise direction as viewed in Fig. 6 whereupon the rotation shall impart two complete revolutions to each of the gears 203 and 204 through the 90 degree movement of the gear 201.

A rock arm such as 215 is pivotally supported upon the pin 202 independently of gear 201 to be actuated by pitman 216 pivotally connected to the pin 217 carried by the arm 215. A pawl 218 is pivotally carried by the arm 215 for engagement with the toothed or ratchet wheel 220 secured to gear 201 and carrying teeth 221 of which there are four so that each 90 degree operation of the arm 215 shall also cause the dog 218 to pick up another successive tooth such as 221 after the clockwise rotation of arm 215, gear 201 being idle during this movement of arm 215. A suitable spring such as 222 maintains the pawl 218 in operative contact with the ratchet wheel 221 during the rocking of arm 215. An adjustable stop such as 223 is provided and supported from the frame in any suitable manner to limit the stroke of the arm 215 under the action of the pitman 216.

Whenever the arm 215 is in the position indicated in Fig. 6, a latch member 224 secured to arm 215 engages the notch of the latch bar 225 for preventing any movement to the left of the pitman 216 during the time the tying mechanism remains idle. Pitman 216 has its other end pivotally connected at 226 to an arm 227 pivotally supported upon a pin 228 carried by a bracket 230 depending from the chassis 21. Normally the spring 231 urges the pitman 216 to the left in Fig. 5, but this motion is constrained by means of the latch bar 225 being hooked or in engaged position with the latch 224 carried by the arm 215. Obviously, the release of the latch bar 225 from the latch 224 will allow the spring 231 to act upon the lever 227 moving the pitman 216 to the left as in Fig. 5 for moving the arm 215 counterclockwise with the pawl 218 engaging one of the teeth of the ratchet 220, whereby the gear wheel 201 is moved counter-clockwise revolving the two twisting gears 203 and 204. This counterclockwise motion is halted by means of the stop 223 in Fig. 6 that will normally position the gears 203 and 204 in such angular positions as to have their wire receiving slots 210 and 211 in proper alignment to receive the wires upon the next succeeding entry thereof at the end of the baling operation. The twisted wires will normally maintain the gears 203 and 204 in the position shown in Fig. 6 and said wires will normally act to hold the large gear 201 against any retractive movement in a clockwise direction as the pawl 218 snaps over another tooth 221 of the ratchet 220 when the pitman 216 and its connected arm 215 is returned in a clockwise direction into the latched relation illustrated in Fig. 6.

Referring to Fig. 8 it will be noted that the latch bar 225 is pivoted at 235 upon a suitable bracket 236 secured to the side 30 of the baler frame; while a spring 237 is connected between the latch bar 225 and the baler for normally maintaining the bar in operative engagement with the latch 224 of the arm 215. A suitable stop such as 240 is carried by the bracket 236 while an adjustable set screw such as 241 is carried by the latch bar 225 to prevent any movement of the bar beyond a set predetermined point and towards the baler frame, and obviously to place this bar in operative relation to be engaged by the latch 224 as the pitman 216 rocks the arm 215 in a clockwise direction. The latch bar 225 is operated through the action of the upper needle as the latter is brought into its extreme projected position as indicated in dotted lines in Fig. 8. This moves the bar 225 outwardly away from the latch 224 and allows the spring 231 to move the pitman 216 and the tying mechanism is therethrough operated.

From the foregoing description it shall be perceived that the tying action takes place immediately upon the termination of the movement of the needles into their fully projected position. Each needle in its outward stroke across the baling chamber will pick up its adjacent wire at the needle side of the baler and will carry these wires across to the wires on the opposite side of the baler, whereupon the latter wires also are picked up by the needle, and finally each pair of upper and lower wires are carried by their respective needles into the slots 210 and 211 of the twisting gears 203 and 204. Upon the turning of the latter gears each respective pair of wires is twisted on either side of such gears and the wire twists adjacent the baler side of the gears will tie the looped wire about the finished bale; while the twists towards the outer side of the gears and away from the baler act to tie the wires together for the next succeeding bale. These outer twists which finally take the positions shown at 196 and 197 in Fig. 3 upon retraction of the needles are fairly short and tightly wound. This action is controlled by the use of notched limiting plates such as 245 and 246, best illustrated in Figs. 3, 6 and 8, such plates being aligned with the axial positioning of the wire through the twisting gears when the wires are in operative relation with the gears. These plates 245 and 246 can be positioned in a predetermined spaced relation with respect to the twisting gears, thereby limiting the spread of the twist of the wires beyond the plates and so causing the gears to tightly twist the wire between the gears and the plates. These plates are carried upon the bracket 247 immediately secured to plate 207 as by means of screws or the like.

The operation of cutting the twisted wires is accomplished by a pair of knives 248 and 250 pivotally mounted as at 251 upon the bracket 247. A connecting bar 252 extends between the knives 248 and 250 and is pivotally secured thereto as at 253 and 254 respectively. A pin 255 is carried by the bar 252 and projects outwardly toward the baler side of the bar to engage a stop 256, the entire bar and pin being maintained downwardly against the stop 256 by means of a tension spring 257 connected between the end of the bar 252 and the baler frame and obviously the knives will substantially be maintained in the relationship shown in Fig. 6 under normal conditions of operation. However, after the twisting operation, or immediately toward the end of the twisting operation by the gears 203 and 204, the arm 215 which actuates gear 201 by means of the pawl 218 and ratchet 220 is provided with a suitable striking arm 258 having a projecting striking knob 260 which is adapted for engaging the portion of the pin 255 which projects outwardly from bar 252 in the direction away from the baler side. Consequently substantially at the end of the twisting operation, the knob 260 will then engage the pin 255 for raising the bar 252 against the action of the spring 257 whereby the knives 248 and 250 will be rotated clockwise as illustrated in Fig. 6 for severing each of the pairs of wires in the gears 203 and 204 simultaneously. As the arm 215 is reversed in its action to be relatched as occurs when the latch 224 engages the end of the latch bar 225, the knives will again resume their initial inoperative position to await that portion in the cycle of operation of the machine wherein they will again be operated by the knob 260 as explained.

It is now apparent that the operations consisting of the action of the needles in picking up the wires and projecting the same in pairs into the twisting and cutting mechanisms, the subsequent twisting of the wires and the final cutting thereof, are all operations which take place during a forward or compression stroke of the plunger and its connected cross-heads 60 and 61. It has already been explained that the reversal of the motion of the plunger and its cross-head 60 will return the needle carriage and associated parts to normal inoperative position. Referring now to Fig. 5 it will be seen that the return of the cross-head 61 on the tying side of the machine will also re-establish the twisting and cutting mechanism into its normal inoperative position as shown in Figs. 5 and 6. The restoration of the parts just mentioned is accomplished by means of an angle 261 secured to a plate 262 adjustably bolted to the side of the plate 68 of the cross-head 61, said plate 68 also containing an adjusting screw 263 for engaging the upstanding end portion 264 of the plate 262. The depending angle 261 is adapted to strike a roller 265 carried by the pin 266 which is secured to the arm 227 supporting one end of the pitman 216. Obviously, upon the return stroke of the plunger and its cross-heads, the angle 261 will therefore strike the roller 265 and move the lever 227 in a clockwise direction to retract the pitman 216 thereby causing the arm 215 of the twisting and cutting mechanism to relatch itself by means of the latch 224 and latch bar 225.

With the addition of an adjustable feature of having the angle 261 movable relative to the plate 68 of the cross-head 61, it is possible to maintain the parts in such relation that parts 215, 216, and 227 will all be brought just far enough back to cause the latching of the member 224 and 225. Thereafter, the reciprocation of the cross-head 61 will merely bring the angle 261 up against the roller 265 without having a continuous banging of these parts and unnecessary movement of the connected linkages. The other end of the movement of the pitman 216 and its associated parts 215 and 227 is controlled as previously explained by the stop screw 223 so as to always position the gears 201, 203 and 204 in their proper relationship for receiving the next wire strands for twisting and cutting.

Inasmuch as the gear 201 is free upon the pin 202 and the parts cooperating therewith including the arm 215 are rockably supported upon the pin, it is also possible to provide a means or mechanism which will cooperate with the gear 201 to cause a positive stoppage of this gear and also of the arm 215 by the reaction of the ratchet 220 upon the pawl 218. Such a mechanism has been illustrated in Fig. 7 wherein the gear 201 has been provided with a plurality of pins such as 270 located in equal angular relation to form stopping stations for the wheel 201. Inasmuch as each of the reciprocal actions of the present twisting and cutting mechanism is accomplished by a 90 degree displacement of the parts as explained, four such pins 270 are provided. Cooperating with the pins is a positive stop member 271 adjustably mounted a link 272 pivotally connected at 273 to the arm 215 and suspended by a link 274 which is swingably mounted at 275 upon the baler side 30. With this construction, upon each movement of the pitman 216 through the action of spring 231, arm 215 is rotated in counter-clockwise direction as viewed in Fig. 7, through which action the linkage consisting of the members 274 and 272 will act to bring the stop 271 into a position to be contacted by one of the pins 270 at the precise moment of a 90 degree angular displacement of the wheel 201 through the action of the spring pressed pawl 276 carried by the arm 215 and the ratchet wheel 277. Upon the return of the pitman 216 and the arm 215 to their normal latched position, the connected links 272 and 274 will move the stop 271 substantially radially of the wheel 201 and away from the contacted pin 270 so as not to disturb the position of the pin 270 and the wheel 201. The wheel 201 will now again be in a position to rotate the gears 203 and 204 upon the next successive power stroke of the pitman 216 for performing the tying and cutting operations.

Figure 17:
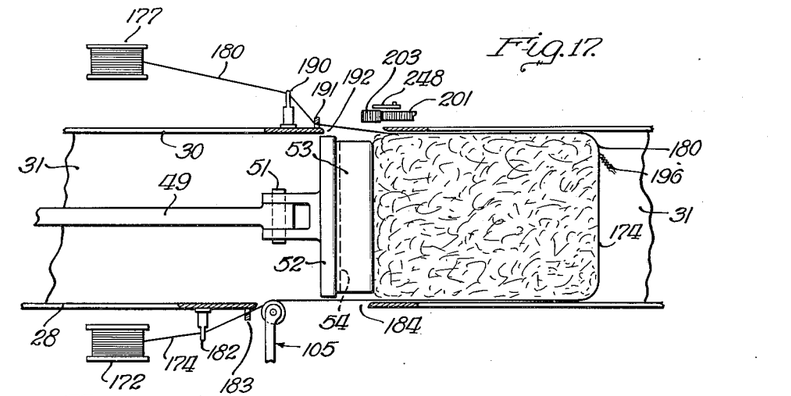
Figs. 17, 18, 19 and 20 are diagrammatic plan views illustrating the main successive steps accomplished by the mechanisms embodied in the present invention for the purpose of producing a completely tied and wired bale of hay.

The various operations of the mechanisms combined to form the means for wire tying the hay bales has been substantially well explained from time to time as the successive descriptions were made of these mechanisms. However, a summary of the operation of the baler may be more clearly understood by reference to the diagrammatic illustrations in Figs. 17 to 20 that substantially indicate the main steps in the operation of the hay baler. Fig. 17 depicts the normal baling operation wherein the plunger 52 and its crosscut block 53, merely reciprocates under the action of the pitman 49 for compressing the hay into the compression chamber to build up the bale to the necessary length as determined by the gauge wheel 140 hereinbefore described. When the gauge wheel 140 and its associated mechanisms operate for causing the needle carriage to advance in a direction to protract the needles, such needles will be substantially projected into the position indicated in Fig. 18. Under this action each needle will pick up its adjacent wire at the needle side of the machine and carry the same across the baling chamber to also pick up the wires at the opposite side of the baling chamber to place the same in twisting position within the gears 203 and 204. Attention is directed at this time to the fact that the plunger 52 is adapted to move the plunger head or block 53 somewhat beyond the positions of the needles. It is for this reason that the plunger block 53 has been provided with the horizontally disposed slots 54 and 55 illustrated in Fig. 9 to permit the necessary clearance for the needles whereby also the wires from the nearest or needle side of the machine are carried about a finished bale of compressed hay as such needles move through the plunger cavities.

Figures 18, 19, 20:
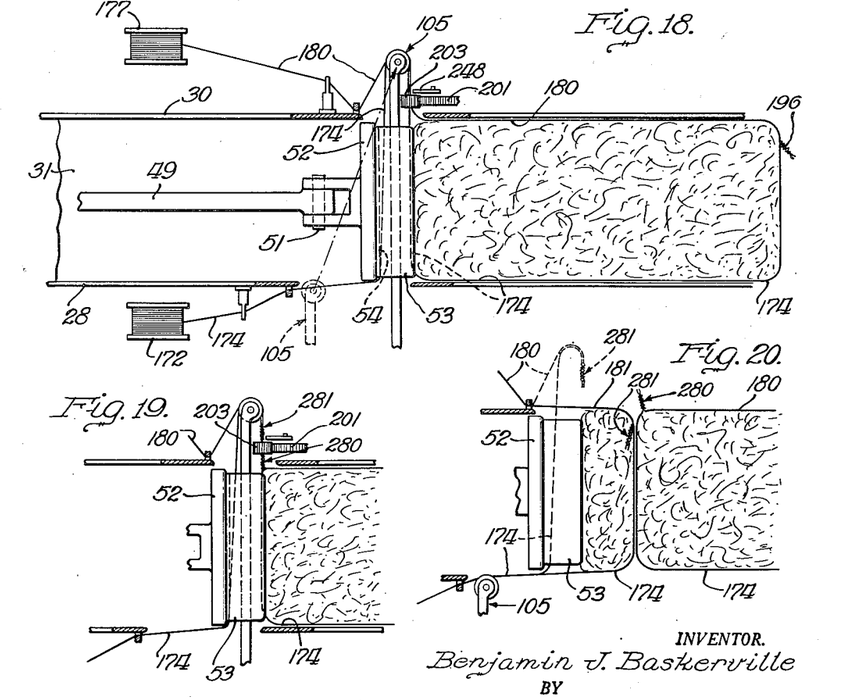

In Fig. 19 it will be noted that the twisting action has taken place by the operation of the gears 201, 203 and 204 providing a pair of twisted wire sections indicated generally at 280 and 281. The wire sections 280 obviously complete the tying of the finished bale while the twist 281 knots the wires 174 and 180 to prepare the loops for the next succeeding bale to be formed. Subsequently the cutting knives come into play and sever the wires immediately adjacent the outer face of the gears 203 and 204 to establish the dotted line loop illustrated at 281 in Fig. 20. Upon the next succeeding compression stroke of the plunger another charge of hay will straighten out the loop illustrated substantially as shown in the full lines in Fig. 20 with the knot or tied portion 281 of the wires taking such positions substantially as there shown. The plunger will now continue its reciprocating action to press hay into the compression chamber and against the loops formed by the wires as back-stops, this action also moving the finished bale outwardly of the hay baler to discharge the same at the rear end thereof. This cycle of operation is then continually repeated at the end of the time each bale is formed, with all of the working mechanisms clearly timed from the most direct point, namely, the plunger and its connected crossheads with the mechanisms devised to include comparatively simple and rugged parts for reducing the first cost of a hay baler of this type together with the low upkeep and maintenance thereof.

It is to be understood that the foregoing description and disclosure are more specifically directed to a preferred construction of the present baling machine and that various changes and modifications are contemplated which will produce equivalent mechanisms or mechanical structures that shall function or produce their operative requirements in a like manner as will the mechanisms described. It is therefore obvious that the present design is not to be limited to the exact form, construction or combination of parts described and illustrated excepting insofar as such structure shall be defined and determined by the breadth and scope of the appended claims.

What I claim is:

1. The combination with a baling press having a compression chamber and a reciprocable material pressing plunger operable within said chamber, of wire feed means to introduce wires into opposite sides of said chamber, the ends of said wires being connected across said chamber to back up compressed material, wire looping needles mounted for movement relative to said chamber to loop the wires about the open end of a finished bale, trip operated wire tying and cutting means adapted for receiving said looped wires from said needles, and actuating means carried by said reciprocable plunger to operate said needles, one of said needles being arranged to engage and release said trip operated wire tying and cutting means at predetermined intervals.

2. The combination with a baling press having a compression chamber and a reciprocable material pressing plunger operable within said chamber, of wire feed means to introduce wires into opposite sides of said chamber, the ends of said wires being connected across said chamber to back up compressed material, wire looping needles mounted for movement relative to said chamber to loop the wires about the open end of a finished bale, trip operated wire tying and cutting means adapted for receiving said looped wires from said needles, actuating means carried by said reciprocable plunger to operate said needles, one of said needles being arranged to engage and release said trip operated wire tying and cutting means at predetermined intervals, and gauge means operable upon the formation of a bale of definite size and coacting with said reciprocable plunger actuating means to cause the latter to operate the needles and said tying and cutting means at predetermined intervals.

3. A wire tying and cutting mechanism for joining the wires on a completed bale and to form new loops of wire for the next succeeding bale in a plunger operated baling press, comprising wire twisting gears, wire cutting means, needle means for bringing said wires to said gears and cutting means, operative means for rotating said gears a predetermined amount and to operate said cutting means, spring operated actuating mechanism for said operative means, and latch means to normally prevent actuation of said operative means, said needle means being adapted to release said latch means to cause the operative means to be actuated by said spring operated actuating mechanism whereby said wires are twisted and severed.

4. A wire tying and cutting mechanism for joining the wires on a completed bale and to form new loops of wire for the next succeeding bale in a baling press, comprising in combination with a plunger, wire twisting gears, wire cutting means, needle means for bridging said wires to said gears and cutting means, operative means for rotating said gears a predetermined amount and to operate said cutting means, actuating mechanism for said operative means, latch means to normally prevent actuation of said operative means, said needle means being adapted to release said latch means to cause the operative means to be actuated by said actuating mechanism whereby said wires are twisted and severed, and cooperative means carried by said plunger and actuating mechanism respectively to again relatch the latch means to prevent operation of the twisting gears and cutting means by said operative means.

5. A wire tying and cutting mechanism for joining the wires on a completed bale and to form new loops of wire for the next succeeding bale in a plunger operated baling press, comprising twisting means to tie each set of wires at spaced points, a cutting means to sever said set of wires intermediate said spaced and tied points, wire moving means to bring each set of wires into operative relation with respect to said twisting and cutting means, and releasable pre-stressed operating mechanism connected with said twisting and cutting means to actuate those means, said wire moving means being adapted to cause release of said pre-stressed operating mechanism to actuate said twisting and cutting means when the wire sets are brought into operative relation with said latter means.

6. A wire tying and cutting mechanism for joining the wires on a completed bale and to form new loops of wire for the next succeeding bale in a baling press, comprising in combination with a plunger, twisting means to tie each set of wires at spaced points, a cutting means to sever said set of wires intermediate said spaced and tied points, wire moving means to bring each set of wires into operative relation with respect to said twisting and cutting means, releasable operating mechanism connected with said twisting and cutting means to actuate those means, said wire moving means being adapted to cause release of said operating mechanism to actuate said twisting and cutting means when the wire sets are brought into operative relation with said latter means, and coacting members carried by said plunger and said releasable operating mechanism respectively to reset the latter into normal inoperative position.

7. A wire tying and cutting mechanism for joining the wires on a completed bale and to form new loops of wire for the next succeeding bale in a plunger operated baling press, comprising wire twisting means for tying each pair of wires, a cutting means to sever said pairs of wires, wire displacing means for looping the wires about a finished bale and to bring the same into operative relation with said twisting and cutting means, and releasable pre-stressed operating mechanism connected with said twisting means to actuate the same, said wire displacing means being adapted to cause release of said pre-stressed operating mechanism whereby said twisting means is actuated, and cooperative members carried by said operating and cutting means respectively, whereby the wires are severed at the conclusion of the twisting action.

8. A wire tying and cutting mechanism for joining the wires on a completed bale and to form new loops of wire for the next succeeding bale in a baling press, comprising in combination with a plunger, wire twisting means for tying each pair of wires, a cutting means to sever said pairs of wires, wire displacing means for looping the wires about a finished bale and to bring the same into operative relation with said twisting and cutting means, and releasable operating mechanism connected with said twisting and cutting means to operate those means, said wire displacing means being adapted to cause release of said operating mechanism to successively actuate said twisting and cutting means, and positive stop means to check the movement of said twisting means in a predetermined position to dispose said twisting means in a position for again receiving and tying successive sets of wires, said plunger and operating mechanism having cooperative members connected therewith to reset said operating mechanism into unreleased position through the motion of said plunger and independently of said positively stopped twisting means.

9. In combination with a baling press having a reciprocable plunger operating in a wire flanked baling chamber, a needle mechanism to loop the wires about a finished bale, tying and cutting mechanism to receive said looped wires for tying and severing the same, operative means to actuate said tying and cutting mechanism including reset means, said needle mechanism providing the instrumentality to cause said operative means to actuate said tying and cutting mechanism, and cooperative units carried by said plunger to operate said needle mechanism at predetermined intervals and to engage said reset means of the operative means of said tying and cutting mechanism respectively after operation of the latter to subsequently repeat its function.

10. In combination with a baling press having a reciprocable plunger operating in a wire flanked baling chamber, a needle mechanism to loop the wires about a finished bale, tying and cutting mechanism to receive said looped wires for tying and severing the same, operative means to actuate said tying and cutting mechanism including reset means, said needle mechanism providing the instrumentality to cause said operative means to actuate said tying and cutting mechanism, cooperative units carried by said plunger to operate said needle mechanism at predetermined intervals and to engage said reset means of the operative means of said tying and cutting mechanism respectively after operation of the latter to subsequently repeat its function, and gauging mechanism responsive to the completion of a bale and connectible with one of said cooperative actuating means carried by said plunger to cause said latter means to function at the aforesaid predetermined intervals.

11. In a baling press having a baling chamber, a plunger associated with said chamber, needle mechanism supported on said chamber and having an operative connection with said plunger, said needle mechanism being adapted for looping wires around a completed bale and comprising a needle for each wire, a carriage supporting said needles for movement transversely of the baling chamber, means for supporting said carriage for movement longitudinally of the baling press, operative means for moving said needles transversely of said chamber when said carriage is moved and cooperative means carried by said plunger and carriage whereby movement of said plunger will move said carriage and actuate said needles.

12. In a baling press having a baling chamber, a plunger associated with said chamber, needle mechanism supported upon said chamber and having operative connection with said plunger, said needle mechanism being adapted for looping wires around a completed bale and comprising a needle for each wire, a carriage for supporting said needles for movement transversely of said baling chamber, means for supporting said carriage for movement longitudinally of the baling press, operative means for moving said needles transversely of said chamber when said carriage is moved, cooperative means carried by said plunger and carriage whereby the plunger is adapted to move said carriage in one direction to actuate said needles, and additional cooperative means also connected with said plunger and carriage to return the latter to its initial position whereby said needles are retracted by the operative means that moves the needles.

13. In a baling press having a pressing chamber, a plunger associated with said chamber, needle mechanism supported upon said chamber adapted for looping wires about a completed bale and having an operative connection with said plunger, said needle mechanism comprising a needle for each wire, a carriage mounted upon said chamber and supporting said needles for transverse movement of said chamber, means for guiding said carriage for longitudinal movement, operative means for moving said needles transversely of said chamber when said carriage is moved longitudinally, and cooperative means carried by said plunger and carriage whereby said plunger is adapted to periodically move said carriage to actuate said needles during a part of the stroke of said plunger.

14. In a baling press having a baling chamber, a plunger associated with said chamber, needle mechanism adapted for looping wires around a completed bale to subject the same to the tying and cutting mechanism, said needle mechanism comprising a needle for each wire, a carriage mounted for longitudinal movement upon said chamber and supporting said needles for transverse movement of said chamber, operative means for moving said needles transversely of said chamber when said carriage is moved longitudinally, cooperative means carried in spaced relation with respect to each other by said plunger and said carriage respectively whereby the plunger is adapted to move said carriage to actuate said needles during only a part of the stroke of the plunger and additional cooperative mechanism automatically operative between said plunger and carriage upon the reverse stroke of said plunger to return the carriage and needles to their initial positions during a part of the reverse stroke of said plunger.

15. A wire tying and cutting mechanism for joining pairs of wires on a completed bale and to form new loops of wire for the next succeeding bale in a plunger operated baling press, comprising wire twisting means for tying each pair of wires, a cutting means to sever said pairs of wires, wire displacing means for looping the wires about a finished bale and to bring the same into operative relation with said twisting and cutting means, and releasable operating mechanism coacting with said twisting and cutting means to operate those means, said wire displacing means being adapted to cause release of said operating mechanism to successively actuate said twisting and cutting means, and positive stop means to check the movement of said twisting means in a predetermined position to dispose said twisting means in a position for again receiving and tying successive sets of wires.

BENJAMIN J. BASKERVILLE.

REFERENCES CITED

The following references are of record in the file of this patent:

UNITED STATES PATENTS

| Number | Name | Date |
| --- | --- | --- |
| 866,934 | Katz | Sept. 24, 1907 |
| 994,662 | Schubert | June 6, 1911 |
| 1,062,243 | Kluge | May 20, 1913 |
| 1,579,777 | Pearson et al. | Apr. 6, 1926 |
| 2,400,555 | Johnston | May 21, 1946 |

FOREIGN PATENTS

| Number | Country | Date |
| --- | --- | --- |
| 34,276 | Netherlands | Dec. 15, 1934 |